Dec. 25, 1934.    J. G. SWAIN    1,985,749
DUAL WHEEL AND DEMOUNTABLE RIM
Original Filed Feb. 16, 1927

Inventor
Joseph G. Swain
By Ely & Barrow
Attorneys

Patented Dec. 25, 1934

UNITED STATES PATENT OFFICE

1,985,749

DUAL WHEEL AND DEMOUNTABLE RIM

Joseph G. Swain, Akron, Ohio, assignor to The Firestone Steel Products Company, Akron, Ohio, a corporation of Ohio Original application February 16, 1927, Serial No. 168,552. Divided and this application March 8, 1933, Serial No. 659,991

2 Claims. (Cl. 301—13)

This invention relates to dual wheels and demountable rim equipment therefor.

One object of the invention is to provide a dual or twin tire construction for fellyless automobile wheels. Another object is to provide separate securing means on the same bolt for attaching the inner and outer rims, the securing means for the inner rim serving also as a spacer for maintaining a fixed distance between the inner and outer rims. A further object is to provide means on the spokes of the wheel for holding the attaching bolts in proper alignment.

Another object of the invention is to adapt the construction to an attached lug demountable rim.

The foregoing and other objects are obtained by the construction shown in the accompanying drawing and described below. It is to be understood that the invention is not limited to the specific form thereof shown and described.

This application is a division of my co-pending application, Serial No. 168,552, filed February 16, 1927, which matured as Patent No. 1,956,428 on April 24, 1934.

Figure 1:
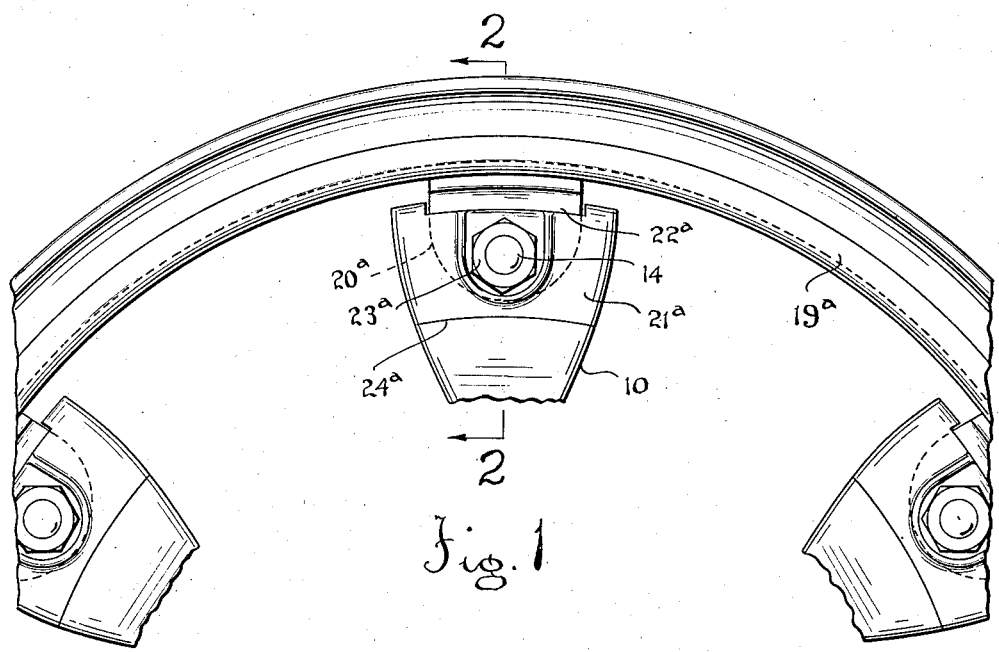
Figure 2:
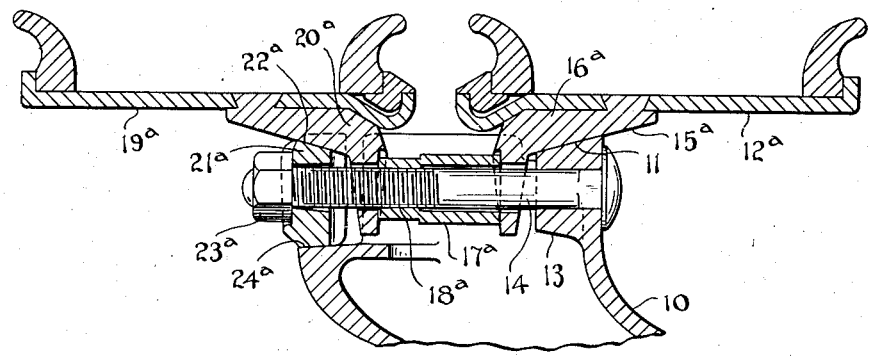

In the accompanying drawing:

Figure 1 is a side elevation partly broken away, of a wheel and rim construction embodying the principles of the invention; and Figure 2 is a radial section taken on the line 2—2 of Figure 1.

Referring more particularly to the drawing, the hollow spokes 10 of a metallic fellyless wheel are provided on the inner side of their radially outward ends with a beveled seat 11 for carrying an inner rim 12$^a$ and an internal boss 13 for holding a bolt 14 in correct alignment in the end of the spoke.

In the form of the invention illustrated the inner rim 12$^a$ is mounted on spokes 10 with the beveled surface 15$^a$ of the attached lug 16$^a$ of the rim wedged against beveled seat 11 and secured in position by clamping sleeves 17$^a$ and integral nut portions 18$^a$ threaded on bolts 14. In this construction, clamping sleeves 17$^a$ also serve as spacers to maintain a fixed distance between the inner rim 12$^a$ and the outer rim 19$^a$. The outer rim 19$^a$ is mounted with its attached lugs 20$^a$ in engagement with clamping sleeves 17$^a$ and is secured on the wheel by means of wedge clamps 21$^a$ forced against the beveled surface 22$^a$ of lugs 20$^a$ by nuts 23$^a$ threaded on bolts 14. Wedge clamps 21$^a$ are also wedged against seats 24$^a$ on the outer side of the spoke ends, thus transmitting the load from rim 19$^a$ to the spokes.

Further modifications of the invention may be resorted to without departing from the spirit thereof or the scope of the appended claims.

What is claimed is:

1. In a wheel structure, a hub, spokes radiating from the said hub, each of the said spokes terminating, at their outer end, in an open section having front, rear, and side walls, inwardly inclined bearing surfaces on the rear walls of the said spokes, an inner rim base having an inside diameter slightly greater than the side walls of the said spokes, driving lugs suitably fastened to the said inner rim base and extending between the side walls of the said spokes, the said driving lugs each being further provided with an inwardly inclined bearing surface, means for clamping the inwardly inclined bearing surface of the said driving lugs against the said inwardly inclined bearing surfaces on the rear wall of the said spokes, outwardly inclined bearing surfaces on the outer walls of the said spokes, an outer rim base, driving lugs suitably fastened to the said outer rim base, each of the said driving lugs being provided with an inwardly inclined bearing surface, and means for clamping the said driving lugs of the outer rim against the said means for clamping the said driving lugs on the said inner rim, the said means for clamping the said driving lugs of the outer rim being supported on the outwardly inclined bearing surfaces on the outer walls of the said spokes.

2. In a dual wheel structure, a hub, spokes radiating from the said hub, each of the said spokes terminating, at its outer end, in an open section having front, rear, and side walls, inwardly inclined bearing surfaces on the rear walls of the said spokes, a bolt mounted through the rear wall of each of said spoke ends and extending parallel to the axis of said wheel, an inner rim base provided with an inwardly inclined bearing surface, means mounted on said bolts for clamping the inwardly inclined bearing surface against the said inwardly inclined bearing surfaces on the rear wall of the said spokes, outwardly inclined bearing surfaces on the front walls of the said spokes, an outer rim base provided with an inwardly inclined bearing surface, and means mounted on said bolts for clamping the said outer rim against the said means for clamping the said inner rim, the said means for clamping the said outer rim being supported on the outwardly inclined bearing surfaces on the front walls of the said spokes and extending between the side walls of the said spokes.

JOSEPH G. SWAIN.